US012674707B2

(12) United States Patent
Elmfors et al.

(10) Patent No.: US 12,674,707 B2
(45) Date of Patent: Jul. 7, 2026

(54) ATMOSPHERIC ABSORPTION DETERMINATION USING EMBEDDED SENSOR DATA

(71) Applicant: Teledyne FLIR Commercial Systems, Inc., Goleta, CA (US)

(72) Inventors: Per O. Elmfors, Huddinge (SE); Marcel Tremblay, Goleta, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 0 days.

(21) Appl. No.: 18/618,812

(22) Filed: Mar. 27, 2024

(65) Prior Publication Data

US 2024/0240989 A1 Jul. 18, 2024

Related U.S. Application Data

(63) Continuation of application No. PCT/US2022/044429, filed on Sep. 22, 2022.
(Continued)

(51) Int. Cl.
| | |
|---|---|
| *G01J 5/08* | (2022.01) |
| *G01J 5/00* | (2022.01) |
| *H04N 23/23* | (2023.01) |

(52) U.S. Cl.
CPC ............ *G01J 5/0859* (2013.01); *H04N 23/23* (2023.01); *G01J 2005/0077* (2013.01)

(58) Field of Classification Search
None
See application file for complete search history.

(56) References Cited

U.S. PATENT DOCUMENTS

| | | |
|---|---|---|
| 7,168,316 B2 | 1/2007 | Blakeley, III |
| 7,237,946 B2 | 7/2007 | Lindström et al. |
| (Continued) | | |

FOREIGN PATENT DOCUMENTS

| | | |
|---|---|---|
| JP | H02 134522 | 5/1990 |
| KR | 20180110559 | 10/2018 |

OTHER PUBLICATIONS

Minkina, W. et al., "Atmospheric transmission coefficient modelling in the infrared for thermovision measurements", Journal of Sensors and Sensor Systems, Jan. 20, 2016, pp. 17-23, vol. 5, Czestochowa/ Poland.

(Continued)

*Primary Examiner* — Stefan Gadomski
(74) *Attorney, Agent, or Firm* — Haynes and Boone, LLP

(57) ABSTRACT

Techniques for atmospheric absorption determination using embedded sensor data are provided. In one example, a system includes a housing. The system further includes a sensing device within the housing. The sensing device is configured to determine a humidity within the housing and a temperature within the housing. The system further includes a logic device. The logic device is configured to compensate the humidity and the temperature based on a location of the sensing device within the housing relative to heat sources within the housing. The logic device is further configured to determine a moisture value based on compensation of the humidity and the temperature. The logic device is further configured to determine an atmospheric absorption value based on the moisture value. Related devices and methods are also provided.

20 Claims, 7 Drawing Sheets

Related U.S. Application Data

(60) Provisional application No. 63/250,984, filed on Sep. 30, 2021.

(56) References Cited

U.S. PATENT DOCUMENTS

| | | | |
|---|---|---|---|
| 7,332,716 B2 | 2/2008 | Hamrelius et al. | |
| 2005/0121614 A1* | 6/2005 | Stuttard | G01N 21/3504 |
| | | | 250/343 |
| 2018/0266887 A1 | 9/2018 | Frank et al. | |
| 2018/0372547 A1 | 12/2018 | Sasaki | |
| 2020/0271565 A1* | 8/2020 | Gütle | G01N 15/1459 |
| 2021/0055164 A1 | 2/2021 | Solheim | |
| 2022/0132052 A1* | 4/2022 | Mojaver | G06T 7/62 |
| 2024/0344904 A1* | 10/2024 | Matsunaga | A61B 5/01 |

OTHER PUBLICATIONS

Walderman, Daniel, "Modeling of atmospheric transmission coefficient in infrared for thermovision measurements", Journal of Sensors and Sensor Systems, 2015, pp. 903-907, Czestochowa/ Poland.
Labbe, S. et al., "Thermal infra-red remote sensing for water stress estimation in agriculture", Options Méditerranéennes, n. 67, 2012, pp. 175-184, France.

* cited by examiner

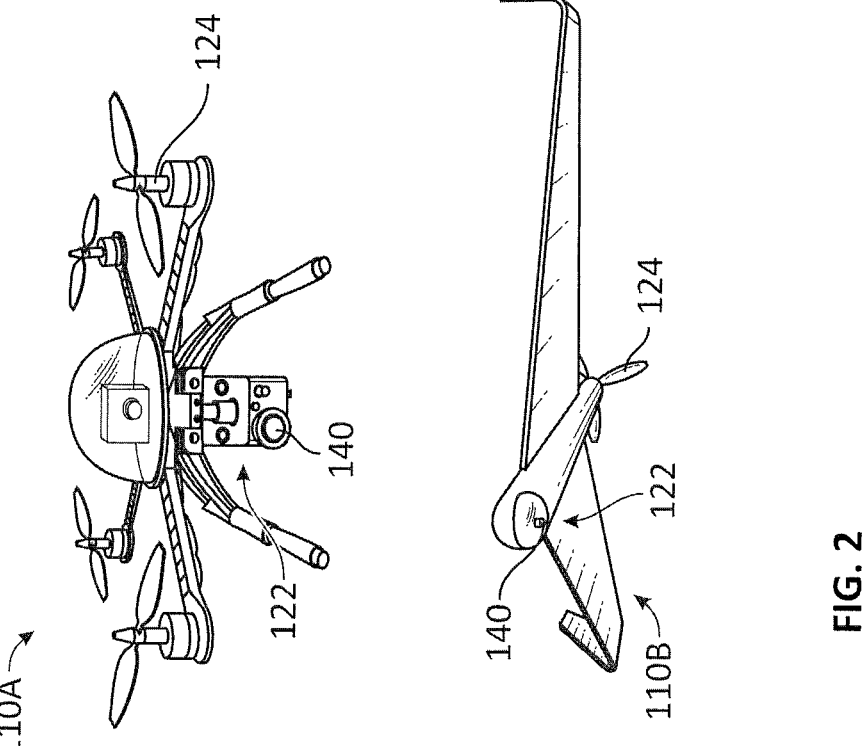
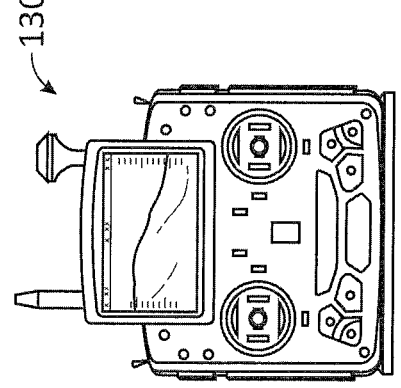
FIG. 2

700

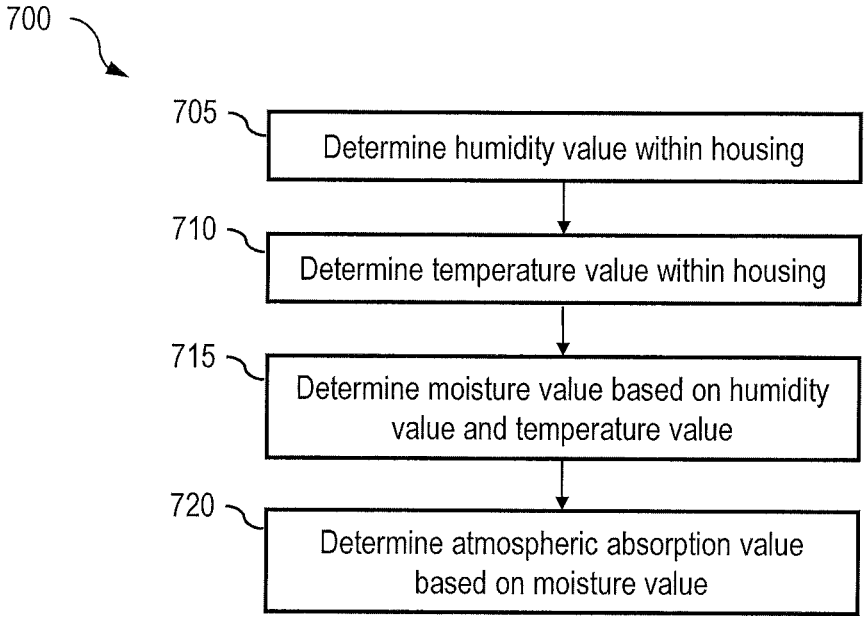

705 — Determine humidity value within housing

710 — Determine temperature value within housing

715 — Determine moisture value based on humidity value and temperature value

720 — Determine atmospheric absorption value based on moisture value

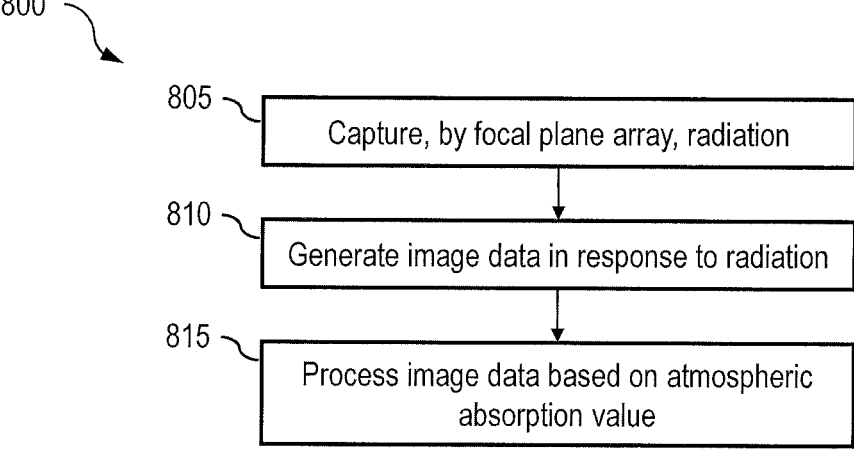

805 — Capture, by focal plane array, radiation

810 — Generate image data in response to radiation

815 — Process image data based on atmospheric absorption value

FIG. 8

ATMOSPHERIC ABSORPTION DETERMINATION USING EMBEDDED SENSOR DATA

CROSS REFERENCE TO RELATED APPLICATIONS

This application is a continuation of International Patent Application No. PCT/US2022/044429 filed Sep. 22, 2022 and entitled "ATOMOSPHERIC ABSORPTION DETER-MINATION USING EMBEDDED SENSOR DATA," which claims priority to and the benefit of U.S. Provisional Patent Application No. 63/250,984 filed Sep. 30, 2021 and entitled "ATMOSPHERIC ABSORPTION DETERMINA-TION USING EMBEDDED SENSOR DATA," all of which are incorporated herein by reference in their entirety.

TECHNICAL FIELD

One or more embodiments relate generally to atmospheric absorption determination and, more particularly, to atmospheric absorption determination using embedded sensor data.

BACKGROUND

Modern unmanned sensor platforms, such as unmanned aerial systems (UASs) or unmanned aerial vehicles (UAVs), are able to operate over long distances and in various environments (e.g., rural, urban, undeveloped). In particular, UAVs are used to support a wide range of real-world applications including surveillance, reconnaissance, exploration, item transportation, disaster relief, aerial photography, large-scale agriculture monitoring, and others. For example, a UAV may be equipped with a variety of different elements, such as different types of sensors and navigation devices, and may be configured to address a broad variety of operational needs.

SUMMARY

In one or more embodiments, a system includes a housing. The system further includes a sensing device within the housing. The sensing device is configured to determine a humidity within the housing and a temperature within the housing. The system further includes a logic device. The logic device is configured to compensate the humidity and the temperature based on a location of the sensing device within the housing relative to heat sources within the housing. The logic device is further configured to determine a moisture value based on compensation of the humidity and the temperature. The logic device is further configured to determine an atmospheric absorption value based on the moisture value.

In one or more embodiments, a method includes determining, by a sensing device within a housing, a humidity within the housing. The method further includes determining, by the sensing device, a temperature within the housing. The method further includes compensating the humidity and the temperature based on a location of the sensing device within the housing relative to heat sources within the housing. The method further includes determining a moisture value based on the compensating. The method further includes determining an atmospheric absorption value based on the moisture value.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 2 illustrates a diagram of a survey system in accordance with one or more embodiments of the present disclosure.

FIG. 7 illustrates a flow diagram of an example process for facilitating atmospheric absorption determination with embedded sensor data in accordance with one or more embodiments of the present disclosure.

FIG. 8 illustrates a flow diagram of an example process for generating image data responsive to atmospheric absorption determinations in accordance with one or more embodiments of the present disclosure.

Figure 1:
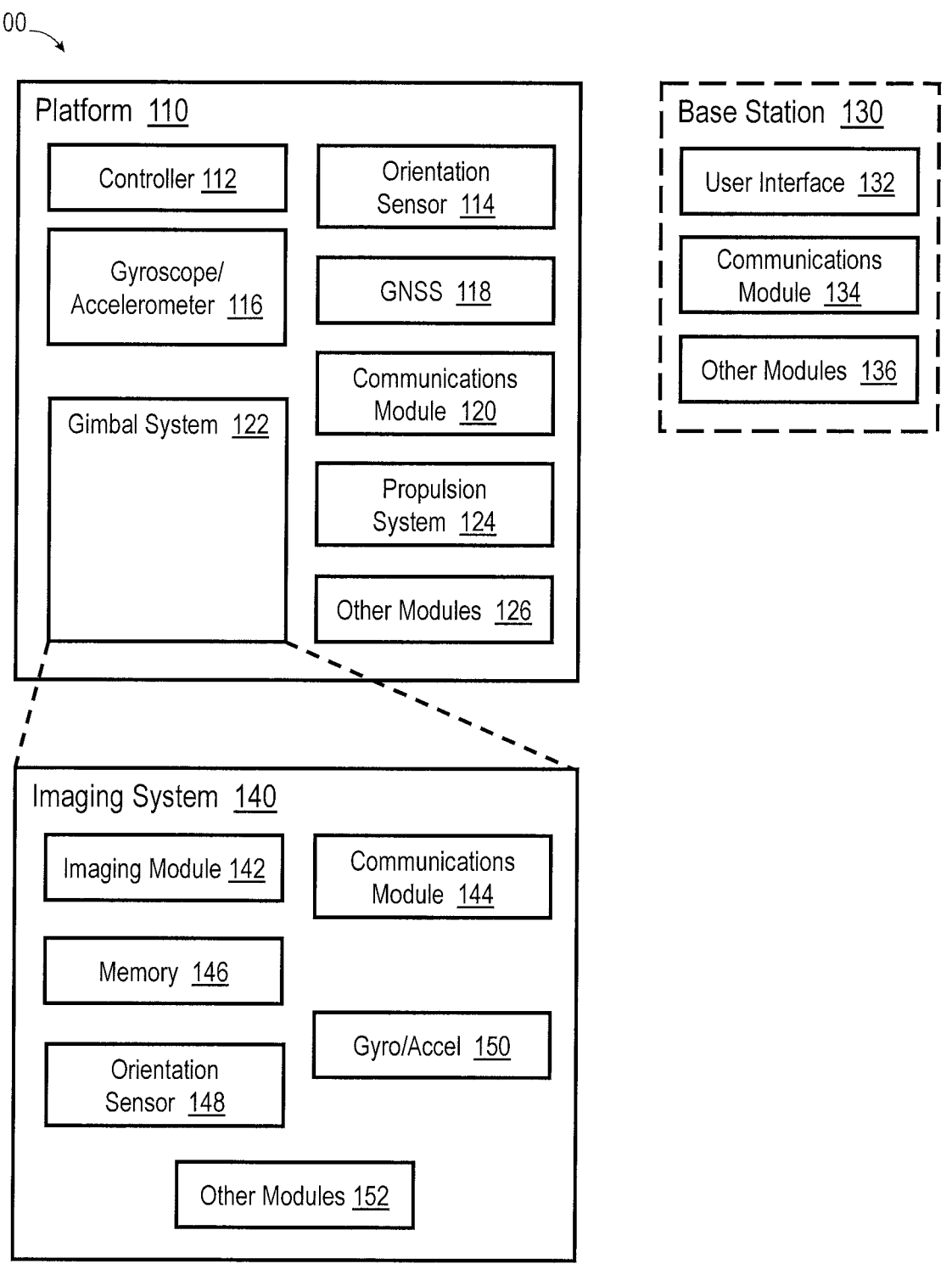
FIG. 1 illustrates a block diagram of a survey system in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various systems and methods are provided for facilitating atmospheric absorption determination using embedded sensor data. A system may include a housing and a sensing device within the housing. The sensing device may include sensors that determine (e.g., measure) a humidity (e.g., a relative humidity) within the housing and a temperature within the housing. The sensing device may be referred to as an embedded sensing device or an integrated sensing device. The system may include a logic device that determines a moisture value based on the humidity and the temperature from the sensing device and determines an atmospheric absorption value/coefficient associated with an atmosphere external to the housing based on the moisture value. In this regard, the system may determine (e.g., estimate) the atmospheric absorption value of the external atmosphere without relying on measurements of air from outside the housing. The atmospheric absorption value depends directly on the moisture value rather than the relative humidity and temperature independently.

The sensing device (e.g., a humidity sensor of the sensing device) may be provided with sufficient airflow (e.g., sufficient continuous airflow) to follow variations in an ambient humidity. In some aspects, the system may include a fan within the housing that blows (e.g., circulates, distributes) air within the housing. In some cases, the fan may receive (e.g., draw in) an external airflow (e.g., air external to the housing) that enters via the housing and blow the external airflow to provide airflow within the housing. The fan may provide good airflow to allow measurement of the humidity by the humidity sensor of the sensing device. In some cases, the sensing device is downstream of the fan relative to the external airflow. In some cases, alternatively or in addition to positioning the sensing device downstream of the fan, the sensing device may be positioned close to a surface along which air flows. For example, when the sensing device is integrated in a payload of an aerial vehicle, the sensing device may be positioned close to a surface along which air flows (e.g., especially when the aerial vehicle is flying). With an appropriately positioned humidity sensor and/or fan, the humidity sensor may continuously receive external air from outside the payload and may measure (e.g., continuously, periodically, upon user request) properties of the external air.

Since the airflow within the housing is heated by heat sources within the housing (e.g., electronics and/or a temperature control element(s) (e.g., cooling flanges) within the housing), the moisture value may be determined using an equation, a lookup table, and/or any relationship that appropriately takes into consideration (e.g., compensates) for the heat generated by the electronics and/or the temperature control element(s). As one example, the temperature value and the humidity value from the sensing device may be compensated. The compensated temperature value and the compensated humidity value may be used to determine the moisture value. In this regard, the temperature within the housing is generally higher than an ambient temperature outside of the housing. In some cases, the fan and the temperature control element(s) (e.g., cooling flanges, heat sink) may be used to dissipate heat and/or otherwise control a temperature within the housing (e.g., to avoid overheating of the electronics and/or other components within the housing). As such, the atmospheric absorption value determined based on such a moisture value implicitly takes into consideration (e.g., compensates) for the heat generated by the electronics and/or temperature control element(s). Thus, using various embodiments, the atmospheric absorption value of the atmosphere external to the housing may be determined (e.g., estimated) using measurements of sensors embedded within (e.g., integrated in) the housing.

In some embodiments, the system may include, or may be used with, infrared imaging devices. In such embodiments, an accurate assessment of the atmospheric absorption value may allow for radiometric accuracy of the infrared imaging systems (e.g., thermal infrared imaging systems) even when viewing objects at a distance. In this regard, an atmosphere is present between the objects of the scene and an infrared imaging system and an effect of the atmosphere on EM radiation traversing the atmosphere may be quantified by, for example, the atmospheric absorption value. The infrared imaging system includes a detector array and a readout circuit. The detector array includes detectors (e.g., also referred to as detector pixels, detector elements, or simply pixels). Each detector pixel detects incident EM radiation and generates image data (e.g., infrared image data) indicative of the detected EM radiation of a scene. In some embodiments, the detector array is used to detect infrared radiation (e.g., thermal infrared radiation). For pixels of an infrared image (e.g., thermal infrared image), each output value of a pixel may be represented/provided as and/or correspond to a temperature, digital count value, percentage of a full temperature range, or generally any value that can be mapped to the temperature. For example, a digital count value of 13,000 output by a pixel may represent a temperature of 160° C. In some embodiments, the pixels of the infrared image may be processed using the atmospheric absorption value to generate an infrared image that compensates for a distance between objects in the scene and the detector array. Such an infrared image may be referred to as a compensated infrared image that is formed of compensated image data.

As a non-limiting example, the system may be a payload of a UAV. The system may include a housing, a sensing device within the housing, and an infrared imaging device within the housing. The UAV may, during operation (e.g., such as during flight), use the infrared imaging device to capture targets that are at a distance sufficiently far such that compensation for the atmosphere between the infrared imaging device and the targets may noticeably affect radiometric accuracy. A location of the sensing device is generally influenced/determined by mechanical constraints of the payload. Having the sensing device contained within the housing of the payload may avoid design constraints associated with conventional approaches in which a humidity sensor and/or other sensors may be mounted directly in an external airflow and far away from power dissipating electronics of the payload to avoid effects of the power dissipating electronics on humidity and temperature measurements. Using various embodiments, the design of the payload may be simplified by positioning sensors within the payload housing while compensating for effects of the power dissipating electronics.

Although various embodiments for atmospheric absorption determination using embedded sensor data are described primarily with respect to infrared imaging, methods and systems disclosed herein may be utilized in conjunction with devices and systems such as visible-light imaging systems, imaging systems having visible-light and infrared imaging capability, short-wave infrared (SWIR) imaging systems, light detection and ranging (LIDAR) imaging systems, radar detection and ranging (RADAR) imaging systems, millimeter wavelength (MMW) imaging systems, ultrasonic imaging systems, X-ray imaging systems, microscope systems, mobile digital cameras, video surveillance systems, video processing systems, or other systems or devices that may need to obtain image data in one or multiple portions of the EM spectrum. Furthermore, although various embodiments are described with respect to UAVs/UASs, methods and systems disclosed herein may be utilized generally in any applications, such as imaging applications or otherwise, in which atmospheric absorption characteristics of an atmosphere external to a housing may be determined (e.g., estimated) based on sensor data (e.g., humidity and/or temperature measurements) from sensors embedded within the housing.

Referring now to the drawings, FIG. 1 illustrates a block diagram of a survey system 100 including a mobile platform 110 in accordance with one or more embodiments of the present disclosure. In various embodiments, the survey system 100 and/or elements of the survey system 100 may be configured to fly over a scene or survey area, to fly through a structure, or to approach a target and image or sense the scene, structure, or target, or portions thereof, using a gimbal system 122 to aim an imaging system/sensor payload 140 at the scene, structure, or target, or portions thereof, for example. Resulting imagery and/or other sensor data may be processed (e.g., by the sensor payload 140, mobile platform 110, and/or base station 130) and displayed to a user through use of a user interface 132 (e.g., one or more displays such as a multi-function display (MFD), a portable electronic device such as a tablet, laptop, or smart phone, or other appropriate interface) and/or stored in memory for later viewing and/or analysis. In some embodiments, the survey system 100 may be configured to use such imagery and/or sensor data to control operation of the mobile platform 110 and/or the sensor payload 140, as described herein, such as controlling the gimbal system 122 to aim the sensor payload 140 towards a particular direction, and/or controlling a propulsion system 124 to move the mobile platform 110 to a desired position in a scene or structure or relative to a target.

In the embodiment shown in FIG. 1, the survey system 100 includes the mobile platform 110, optional base station 130, and at least one imaging system/sensor payload 140. The mobile platform 110 may be implemented as a mobile platform configured to move or fly and position and/or aim the sensor payload 140 (e.g., relative to a designated or detected target). As shown in FIG. 1, the mobile platform 110 may include one or more of a controller 112, an orientation sensor 114, a gyroscope/accelerometer 116, a global navigation satellite system (GNSS) 118, a communications module 120, a gimbal system 122, a propulsion system 124, and other modules 126. Operation of the mobile platform 110 may be substantially autonomous and/or partially or completely controlled by the optional base station 130, which may include one or more of a user interface 132, a communications module 134, and other modules 136. In other embodiments, the mobile platform 110 may include one or more of the elements of the base station 130, such as with various types of manned aircraft, terrestrial vehicles, and/or surface or subsurface watercraft. The sensor payload 140 may be physically coupled to the mobile platform 110 and be configured to capture sensor data (e.g., visible spectrum images, infrared images, narrow aperture radar data, and/or other sensor data) of a target position, area, and/or object(s) as selected and/or framed by operation of the mobile platform 110 and/or the base station 130. In some embodiments, one or more of the elements of the survey system 100 may be implemented in a combined housing or structure that can be coupled to or within the mobile platform 110 and/or held or carried by a user of the survey system 100.

The controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of the mobile platform 110 and/or other elements of the survey system 100, such as the gimbal system 122, for example. Such software instructions may also implement methods for processing infrared images and/or other sensor signals, determining sensor information, providing user feedback (e.g., through the user interface 132), querying devices for operational parameters, selecting operational parameters for devices, or performing any of the various operations described herein (e.g., operations performed by logic devices of various elements of the survey system 100).

In addition, a non-transitory medium may be provided for storing machine readable instructions for loading into and execution by the controller 112. In these and other embodiments, the controller 112 may be implemented with other components where appropriate, such as volatile memory, non-volatile memory, one or more interfaces, and/or various analog and/or digital components for interfacing with devices of the survey system 100. For example, the controller 112 may be adapted to store sensor signals, sensor information, parameters for coordinate frame transformations, calibration parameters, sets of calibration points, and/or other operational parameters, over time, for example, and provide such stored data to a user using the user interface 132. In some embodiments, the controller 112 may be integrated with one or more other elements of the mobile platform 110, for example, or distributed as multiple logic devices within the mobile platform 110, base station 130, and/or sensor payload 140.

In some embodiments, the controller 112 may be configured to substantially continuously monitor and/or store the status of and/or sensor data provided by one or more elements of the mobile platform 110, sensor payload 140, and/or base station 130, such as the position and/or orientation of the mobile platform 110, sensor payload 140, and/or base station 130, for example. In various embodiments, sensor data may be monitored and/or stored by the controller 112 and/or processed or transmitted between elements of the survey system 100 substantially continuously throughout operation of the survey system 100, where such data includes various types of sensor data (e.g., for atmospheric absorption determination), control parameters, and/or other data.

The orientation sensor 114 may be implemented as one or more of a compass, float, accelerometer, and/or other device capable of measuring an orientation of the mobile platform 110 (e.g., magnitude and direction of roll, pitch, and/or yaw, relative to one or more reference orientations such as gravity and/or Magnetic North), gimbal system 122, imaging system/sensor payload 140, and/or other elements of system 100, and providing such measurements as sensor signals and/or data that may be communicated to various devices of the survey system 100. In some cases, a yaw and/or position of the mobile platform 110 may be adjusted to better position/orient the mobile platform 110. The gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of the mobile platform 110 and/or other elements of the survey system 100 and providing such measurements as sensor signals and/or data that may be communicated to other devices of the survey system 100 (e.g., user interface 132, controller 112). The GNSS 118 may be implemented according to any global navigation satellite system, including a GPS, GLONASS, and/or Galileo based receiver and/or other device capable of determining absolute and/or relative position of the mobile platform 110 (e.g., or an element of the mobile platform 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of the survey system 100. In some embodiments, the GNSS 118 may include an altimeter, for example, or may be used to provide an absolute altitude.

The communications module 120 may be implemented as any wired and/or wireless communications module configured to transmit and receive analog and/or digital signals between elements of the survey system 100. For example, the communications module 120 may be configured to receive flight control signals and/or data from the base station 130 and provide them to the controller 112 and/or propulsion system 124. In other embodiments, the communications module 120 may be configured to receive images and/or other sensor information (e.g., visible spectrum and/or infrared still images or video images) from the sensor payload 140 and relay the sensor data to the controller 112 and/or base station 130. In some embodiments, the communications module 120 may be configured to support spread spectrum transmissions, for example, and/or multiple simultaneous communications channels between elements of the survey system 100. Wireless communication links may include one or more analog and/or digital radio communication links, such as WiFi and others, as described herein, and may be direct communication links established between elements of the survey system 100, for example, or may be relayed through one or more wireless relay stations configured to receive and retransmit wireless communications. Communication links established by the communication module 120 may be configured to transmit data between elements of the survey system 100 substantially continuously throughout operation of the survey system 100, where such data includes various types of sensor data, control parameters, and/or other data.

The gimbal system 122 may be implemented as an actuated gimbal mount, for example, that may be controlled by the controller 112 to stabilize the sensor payload 140 relative to a target or to aim the sensor payload 140 or components coupled thereto according to a desired direction and/or relative orientation or position. As such, the gimbal system 122 may be configured to provide a relative orientation of the sensor payload 140 (e.g., relative to an orientation of the mobile platform 110) to the controller 112 and/or communications module 120 (e.g., gimbal system 122 may include its own orientation sensor 114). In other embodiments, the gimbal system 122 may be implemented as a gravity driven mount (e.g., non-actuated). In various embodiments, the gimbal system 122 may be configured to provide power, support wired communications, and/or otherwise facilitate operation of articulated the sensor/sensor payload 140. In further embodiments, the gimbal system 122 may be configured to couple to a laser pointer, range finder, and/or other device, for example, to support, stabilize, power, and/or aim multiple devices (e.g., the sensor payload 140 and one or more other devices) substantially simultaneously.

In some embodiments, the gimbal system 122 may be adapted to rotate the sensor payload 140±90 degrees, or up to 360 degrees, in a vertical plane relative to an orientation and/or position of the mobile platform 110. In further embodiments, the gimbal system 122 may rotate the sensor payload 140 to be parallel to a longitudinal axis or a lateral axis of the mobile platform 110 as the mobile platform 110 yaws, which may provide 360 degree ranging and/or imaging in a horizontal plane relative to mobile platform 110. In various embodiments, the controller 112 may be configured to monitor an orientation of gimbal system 122 and/or sensor payload 140 relative to mobile platform 110, for example, or an absolute or relative orientation of an element of sensor payload 140. Such orientation data may be transmitted to other elements of system 100 for monitoring, storage, or further processing, as described herein.

The propulsion system 124 may be implemented as one or more propellers, rotors, turbines, or other thrust-based propulsion systems, and/or other types of propulsion systems that can be used to provide motive force and/or lift to the mobile platform 110 and/or to steer the mobile platform 110. In some embodiments, the propulsion system 124 may include multiple propellers (e.g., a tri, quad, hex, oct, or other type "copter") that can be controlled (e.g., by the controller 112) to provide lift and motion for the mobile platform 110 and to provide an orientation for mobile platform 110. In other embodiments, the propulsion system 124 may be configured primarily to provide thrust while other structures of the mobile platform 110 provide lift, such as in a fixed wing embodiment (e.g., where wings provide the lift) and/or an aerostat embodiment (e.g., balloons, airships, hybrid aerostats). In various embodiments, the propulsion system 124 may be implemented with a portable power supply, such as a battery and/or a combustion engine/generator and fuel supply.

Other modules 126 may include other and/or additional sensors, actuators, communications modules/nodes, and/or user interface devices, for example, and may be used to provide additional environmental information related to operation of the mobile platform 110, for example. In some embodiments, other modules 126 may include a humidity sensor, a temperature sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of the survey system 100 (e.g., controller 112) to provide operational control of the mobile platform 110 and/or the survey system 100.

In some embodiments, other modules 126 may include one or more actuated and/or articulated devices (e.g., light emitting devices (e.g., light emitting diodes), multi-spectrum active illuminators, visible and/or IR cameras, radars, sonars, and/or other actuated devices) coupled to the mobile platform 110, where each actuated device includes one or more actuators adapted to adjust an orientation of the device, relative to the mobile platform 110, in response to one or more control signals (e.g., provided by the controller 112). In particular, other modules 126 may include a stereo vision system configured to provide image data that may be used to calculate or estimate a position of the mobile platform 110, for example, or to calculate or estimate a relative position of a navigational hazard in proximity to the mobile platform 110. In various embodiments, the controller 112 may be configured to use such proximity and/or position information to help safely pilot the mobile platform 110 and/or monitor communication link quality, as described herein.

The user interface 132 of the base station 130 may be implemented as one or more of a display, a touch screen, a keyboard, a mouse, a joystick, a knob, a steering wheel, a yoke, and/or any other device capable of accepting user input and/or providing feedback to a user. In various embodiments, the user interface 132 may be adapted to provide user input (e.g., as a type of signal and/or sensor information transmitted by the communications module 134 of the base station 130) to other devices of the survey system 100, such as the controller 112. The user interface 132 may also be implemented with one or more logic devices (e.g., similar to the controller 112) that may be adapted to store and/or execute instructions, such as software instructions, implementing any of the various processes and/or methods described herein. For example, the user interface 132 may be adapted to form communication links and transmit and/or receive communications (e.g., infrared images and/or other sensor signals, control signals, sensor information, user input, and/or other information), for example, or to perform various other processes and/or methods described herein.

In one embodiment, the user interface 132 may be adapted to display a time series of various sensor information and/or other parameters as part of or overlaid on a graph or map, which may be referenced to a position and/or orientation of the mobile platform 110 and/or other elements of the survey system 100. For example, the user interface 132 may be adapted to display a time series of positions, headings, and/or orientations of the mobile platform 110 and/or other elements of the survey system 100 overlaid on a geographical map, which may include one or more graphs indicating a corresponding time series of actuator control signals, sensor information, and/or other sensor and/or control signals.

In some embodiments, the user interface 132 may be adapted to accept user input including a user-defined target heading, waypoint, route, and/or orientation for an element of the survey system 100, for example, and to generate control signals to cause the mobile platform 110 to move according to the target heading, route, and/or orientation, or to aim the sensor payload 140 accordingly. In other embodiments, the user interface 132 may be adapted to accept user input modifying a control loop parameter of the controller 112, for example. In further embodiments, the user interface 132 may be adapted to accept user input including a user-defined target attitude, orientation, and/or position for an actuated or articulated device (e.g., the sensor payload 140) associated with the mobile platform 110, for example, and to generate control signals for adjusting an orientation and/or position of the actuated device according to the target attitude, orientation, and/or position. Such control signals may be transmitted to the controller 112 (e.g., using the communications modules 134 and 120), which may then control the mobile platform 110 accordingly.

The communications module 134 may be implemented as any wired and/or wireless communications module configured to transmit and receive analog and/or digital signals between elements of the survey system 100. For example, the communications module 134 may be configured to transmit flight control signals from the user interface 132 to communications module 120 or 144. In other embodiments, the communications module 134 may be configured to receive sensor data (e.g., visible spectrum and/or infrared still images or video images, or other sensor data) from the sensor payload 140. In some embodiments, the communications module 134 may be configured to support spread spectrum transmissions, for example, and/or multiple simultaneous communications channels between elements of the survey system 100. In various embodiments, the communications module 134 may be configured to monitor the status of a communication link established between the base station 130, sensor payload 140, and/or mobile platform 110 (e.g., including packet loss of transmitted and received data between elements of the survey system 100, such as with digital communication links), as described herein. Such status information may be provided to the user interface 132, for example, or transmitted to other elements of the survey system 100 for monitoring, storage, or further processing.

Other modules 136 of the base station 130 may include other and/or additional sensors, actuators, communications modules/nodes, and/or user interface devices used to provide additional environmental information associated with the base station 130, for example. In some embodiments, other modules 136 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of the survey system 100 (e.g., controller 112) to provide operational control of the mobile platform 110 and/or survey system 100 or to process sensor data to compensate for environmental conditions, such as an water content in the atmosphere approximately at the same altitude and/or within the same area as the mobile platform 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by the user interface 132).

In embodiments where the imaging system/sensor payload 140 is implemented as an imaging device, the imaging system/sensor payload 140 may include an imaging module 142, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, the imaging module 142 may include one or more logic devices (e.g., similar to the controller 112) that can be configured to process imagery captured by detector elements of the imaging module 142 before providing the imagery to memory 146 or the communications module 144. More generally, the imaging module 142 may be configured to perform any of the operations or methods described herein, at least in part, or in combination with the controller 112 and/or user interface 132.

In some embodiments, the sensor payload 140 may be implemented with a second or additional imaging modules similar to the imaging module 142, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to the imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

The communications module 144 of the sensor payload 140 may be implemented as any wired and/or wireless communications module configured to transmit and receive analog and/or digital signals between elements of the survey system 100. For example, the communications module 144 may be configured to transmit infrared images from the imaging module 142 to communications module 120 or 134. As another example, the communications module 144 may be configured to transmit measurement ranges to the communications module 120 or 134. In other embodiments, the communications module 144 may be configured to receive control signals (e.g., control signals directing capture, focus, selective filtering, and/or other operation of sensor payload 140) from the controller 112 and/or user interface 132. In some embodiments, communications module 144 may be configured to support spread spectrum transmissions, for example, and/or multiple simultaneous communications channels between elements of the survey system 100. In various embodiments, the communications module 144 may be configured to monitor and communicate the status of an orientation of the sensor payload 140 as described herein. Such status information may be provided or transmitted to other elements of the survey system 100 for monitoring, storage, or further processing.

The memory 146 may be implemented as one or more machine readable mediums and/or logic devices configured to store software instructions, sensor signals, control signals, operational parameters, calibration parameters, infrared images, and/or other data facilitating operation of the survey system 100, for example, and provide it to various elements of the survey system 100. The memory 146 may also be implemented, at least in part, as removable memory, such as a secure digital memory card for example including an interface for such memory.

An orientation sensor 148 of the sensor payload 140 may be implemented similar to the orientation sensor 114 or gyroscope/accelerometer 116, and/or any other device capable of measuring an orientation of the sensor payload 140, the imaging module 142, and/or other elements of the sensor payload 140 (e.g., magnitude and direction of roll, pitch, and/or yaw, relative to one or more reference orientations such as gravity, Magnetic North, and/or an orientation of the mobile platform 110) and providing such measurements as sensor signals that may be communicated to various devices of the survey system 100. A gyroscope/accelerometer (e.g., angular motion sensor) 150 of the sensor payload 140 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of the sensor payload 140 and/or various elements of the sensor payload 140 and providing such measurements as sensor signals that may be communicated to various devices of the survey system 100.

Other modules 152 of the sensor payload 140 may include other and/or additional sensors, actuators, communications modules/nodes, cooled or uncooled optical filters, and/or user interface devices used to provide additional environmental information associated with the sensor payload 140, for example. In some embodiments, other modules 152 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by the imaging module 142 or other devices of the survey system 100 (e.g., controller 112) to provide operational control of the mobile platform 110 and/or survey system 100 or to process imagery to compensate for environmental conditions.

In general, each of the elements of the survey system 100 may be implemented with any appropriate logic device (e.g., processing device, microcontroller, processor, ASIC, FPGA, memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of the survey system 100. In addition, one or more non-transitory mediums may be provided for storing machine readable instructions for loading into and execution by any logic device implemented with one or more of the devices of the survey system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of the survey system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of the survey system 100 may include one or more modules supporting wired, wireless, and/or a combination of wired and wireless communication techniques. In some embodiments, various elements or portions of elements of the survey system 100 may be integrated with each other, for example, or may be integrated onto a single printed circuit board (PCB) to reduce system complexity, manufacturing costs, power requirements, coordinate frame errors, and/or timing errors between the various sensor measurements. Each element of the survey system 100 may include one or more batteries, capacitors, or other electrical power storage devices, for example, and may include one or more solar cell modules or other electrical power generating devices. In some embodiments, one or more of the devices may be powered by a power source for the mobile platform 110, using one or more power leads. Such power leads may also be used to support one or more communication techniques between elements of the survey system 100.

FIG. 2 illustrates a diagram of a survey system 200 including mobile platforms 110A and 110B, each with sensor payloads 140 and associated gimbal systems 122 in accordance with one or more embodiments of the present disclosure. In the embodiment shown in FIG. 2, the survey system 200 includes a base station 130, mobile platform 110A with articulated imaging system/sensor payload 140 and gimbal system 122, and mobile platform 110B with articulated imaging system/sensor payload 140 and gimbal system 122, where the base station 130 may be configured to control motion, position, and/or orientation of the mobile platform 110A, mobile platform 110B, and/or sensor payloads 140. More generally, the survey system 200 may include any number of the mobile platforms 110, 110A, and/or 110B.

Figure 3:
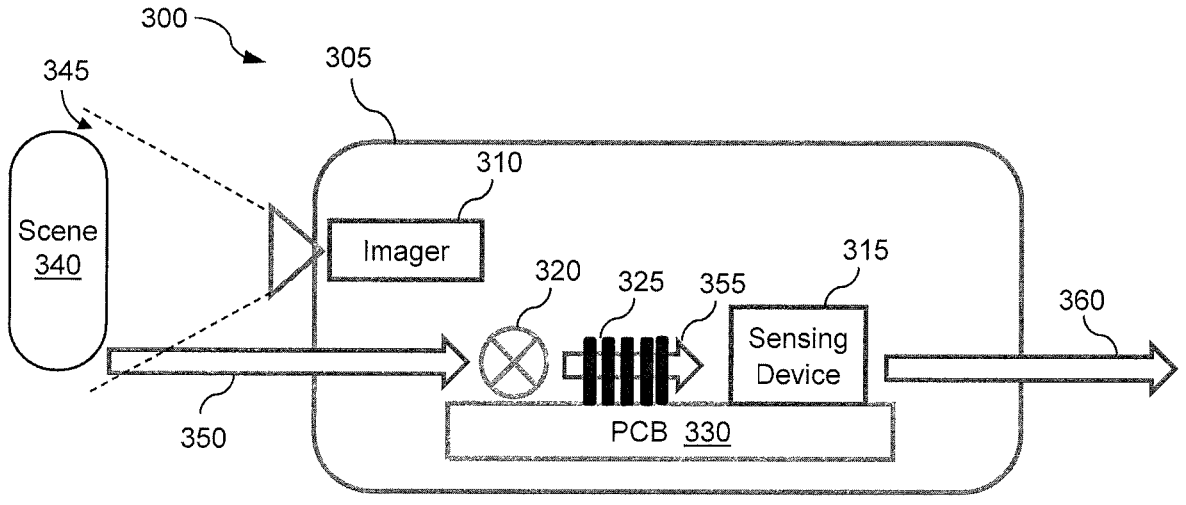
FIGS. 3, 4 and 5 illustrate example systems for facilitating atmospheric absorption determination with embedded sensor data in accordance with one or more embodiments of the present disclosure.

FIG. 3 illustrates an example system 300 for facilitating atmospheric absorption determination with embedded sensor data in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The system 300 includes a housing 305 (e.g., a payload body), an infrared imager 310, a sensing device 315, a fan 320, a temperature control element 325, and a printed circuit board 330. The housing 305 may house the infrared imager 310, the sensing device 315, the fan 320, the temperature control element 325, and the printed circuit board 330. When the system 300 is a payload, the infrared imager 310, the sensing device 315, the fan 320, the temperature control element 325, and the printed circuit board 330 may be referred to as being embedded in the payload or the payload housing. In an embodiment, the infrared imager 310 may be implemented by the sensor payload 140. In an embodiment, the sensing device 315, the fan 320, the temperature control element 325, and/or the printed circuit board 330 may be implemented by the other modules 152.

The infrared imager 310 may include an optical component(s) and an FPA. The optical component(s) may receive electromagnetic radiation from a scene 340 through an aperture 345 of the system 300 and pass the electromagnetic radiation to the FPA. For example, the optical component(s) may direct and/or focus electromagnetic radiation on the FPA. The optical component(s) may include one or more windows, lenses, mirrors, beamsplitters, beam couplers, and/or other components. The optical component(s) may include components each formed of material and appropriately arranged according to desired transmission characteristics, such as desired transmission wavelengths and/or ray transfer matrix characteristics.

The FPA may receive the electromagnetic radiation from the scene 340 through the aperture 345 and the optical component(s) and generate image data based on the electromagnetic radiation (e.g., infrared component of the electromagnetic radiation). The image data may include infrared data values (e.g., thermal infrared data values). As an example, the FPA includes or may be coupled to an analog-to-digital converter (ADC) circuit that generates infrared data values based on infrared radiation. A 16-bit ADC circuit may generate infrared data values that range from 0 to 65,535. The infrared data values may provide temperatures for different portions of the scene, such as provide temperatures of objects, persons, and/or other aspects in a scene. In some cases, the infrared image data may be represented in an image according to a palette, such that a visual representation value (e.g., color value or grayscale value) of each pixel of the image is indicative of a temperature associated with that pixel. In some embodiments, such as when the system 300 is a payload embedded in or coupled to a vehicle (e.g., a UAV), the infrared imager 310 may be capturing images (e.g., as part of surveillance applications) during movement of the vehicle (e.g., flight of the UAV).

The sensing device 315 may measure a humidity within the housing 305 and a temperature within the housing 305. In some cases, the humidity may be a relative humidity. In such cases, the sensing device 315 may include and/or may be referred to as a relative humidity and temperature (RH/T) sensor. In some cases, the sensing device 315 receives air blown within the housing 305 by the fan 320 and/or air within the housing 305 whose temperature is affected by the temperature control element 325. The sensing device 315 may determine a humidity and a temperature of the air (e.g., traversed through the fan 320 and/or the temperature control element 325) received by the sensing device 315.

The fan 320 receives an external airflow 350 (e.g., airflow external to the housing 305) and blows (e.g., circulates, distributes) the external airflow 350 to provide an airflow within the housing 305. In some cases, the fan 320 may draw in the external airflow 350 and blow the external airflow 350 to dissipate heat within the housing 305. An airflow 355 may have its temperature adjusted by the temperature control element 325 and/or electronics within the housing 305 and provided to the sensing device 315 for a humidity measurement, a temperature measurement, and/or other measurements. The fan 320 may continuously provide air (e.g., fresh air) from the outside to the sensing device 315 to allow the sensing device 315 to measure properties of the external airflow 350. In some cases, the fan 320 (e.g., an internal cooling fan) may be used to dissipate heat of electronics (e.g., on the PCB 330) and/or other components within the housing 305. An airflow 360 may represent the internal airflow that exits and/or is expelled out the housing 305.

The temperature control element 325 has a temperature and may be used to set/control a temperature within the housing 305. The temperature control element 325 may control a temperature within the housing 305, such as to dissipate heat of electronics and/or other components within the housing 305. In some cases, the temperature control element 325 may provide a heat sink. The heat sink may be used to draw out heat from the ECB 330. In some cases, the temperature control element 325 may include cooling flanges. In some cases, to control the temperature within the housing 305, a location of the fan 320 and/or the temperature control element 315, a wind speed of the fan 320, and/or the temperature of the temperature control element 315 may be set. In some cases, to control the airflow within the housing 305, a location of the fan 320 and/or a wind speed of the fan 320 may be adjusted.

The PCB 330 may receive measurements from the sensing device 315 and perform computations based on these measurements. The PCB 330 may include electronics (e.g., heat dissipating electronics) within the housing 305. In some embodiments, the PCB 330 may be implemented using one or more logic devices. In some embodiments, the imager 310 may include a logic device that may be used to perform computations, instead of or in addition to a logic device in the PCB 300 to perform computations. In some cases, the PCB 330 may compensate the relative humidity and temperature measurements from the sensing device 315 for heating due to the temperature control element 325 and/or heat dissipating electronics within the housing 305 (e.g., of the PCB 330 and/or elsewhere within the housing 305) to obtain a compensated humidity value and a compensated temperature value. In this regard, such compensation may be based upon a location of the sensing device 315 within the housing 305 relative to heat sources within the housing 305. The PCB 330 may determine a moisture level $\theta_{H2O}$ (e.g., an absolute moisture) based on the compensated humidity value and the compensated temperature value.

In an aspect, the PCB 330 may determine a moisture level $\theta_{H2O}$ (e.g., an absolute moisture) based on the relative humidity and the temperature of the air within the housing 305. In some cases, the moisture level $\theta_{H2O}$ may be provided by:

$$\theta_{H2O} = 13.2348 \; \exp\left(\frac{17.27T}{T+237.36}\right)\frac{RH}{T+273.15} \qquad \text{Equation (1)}$$

where $\theta_{H2O}$ has units of g/m³, RH is the relative humidity value measured by the sensing device 315, and T is the temperature value (e.g., in Celsius) measured by the sensing device 315. In this regard, compensation of the relative humidity value and the temperature value may be characterized by constants in Equation (1).

With the moisture level $\theta_{H2O}$, the PCB 330 may determine an atmospheric absorption $\tau_{atm}$ based on the moisture level $\theta_{H2O}$. In some cases, the atmospheric absorption may have the following form:

$$\tau_{atm} = a_1 \; \exp(-Df_1(\theta_{H2O})) + a_2 \; \exp(-Df_2(\theta_{H2O})) + \ldots \qquad \text{Equation (2)}$$

where D is a distance to a target; a; (e.g., $a_1$, $a_2$, and so forth) are model parameters, and $f_i(\theta_{H2O})$ are model functions that depend on the moisture level $\theta_{H2O}$. In some aspects, the model parameters and the model functions may be determined during manufacturing processes and/or calibration processes of the system 300 or portion thereof (e.g., the infrared imager 310). For example, the model parameters and the model functions may be determined using controlled environments (e.g., environments having known environmental characteristics such as known humidity and/or known temperatures).

In the system 300, the sensing device 315, the fan 320, and the temperature control element 325 are connected to the PCB 330, coupled to the PCB 330, and/or in proximity to the PCB 330. The fan 320 is positioned close to the housing 305 such that the fan 320 receives the external airflow 350. The temperature control element 325 is positioned close to the fan 320. Air blown by the fan 320 passes through the temperature control element 325. The sensing device 315 is positioned downstream from the external airflow 350 relative to positioning of the fan 320 and the temperature control element 325. The fan 320 may draw the external airflow 350 and pass the airflow 355 through the temperature control element 325 and expel the airflow 360.

Since a temperature of the air within the housing 305 is affected by the temperature control element 325, the electronics within the housing 305, and/or other components, the relative humidity within the housing 305, which is dependent on the temperature within the housing 305, changes relative to a relative humidity outside the housing 305. As such, Equations (1) and (2) may be used to determine (e.g., estimate) the moisture content and atmospheric absorption, respectively, outside the housing 305 using measurements (e.g., humidity and temperature measurements) from sensors within the housing 305. In some cases, determination of the moisture content and the atmospheric absorption using measurements from sensors embedded within the housing 305 may facilitate payload design relative to cases in which design of the payload is constrained, such as when the payload needs to accommodate for components, such as sensor components, external to the housing 305.

Although in FIG. 3 the infrared imager 310, the sensing device 315, the fan 320, the temperature control element 325, and the PCB 330 are within the housing 305, in some embodiments the housing 305 include more, fewer, and/or different components. As an example, a logic device for determining the moisture content (e.g., using Equation (1)) and/or the atmospheric absorption (e.g., using Equation (2)) may be outside the housing 305. Computation of the moisture content and/or the atmospheric absorption may be performed in near real-time with measurements provided by the sensing device 315 in near real-time and/or at a later time (e.g., to post-process image data to compensate for atmospheric absorption). The sensing device 315 may transmit, wirelessly or via a wire, data indicative of the measurements. Dependent on application, such transmissions may occur during movement of the system 300 and/or when the system 300 is stationary.

In some embodiments, the system 300 may be, may include, or may be a part of a payload of a vehicle, such as the sensor payload 140 of the survey system 100. Although the system 300 is described as being, including, or being a part of, an infrared imaging system, the system 300 may alternatively or in addition be, include, or be a part of, any system that may determine and/or use humidity data, temperature data, moisture data, and/or atmospheric absorption data.

Figure 4:
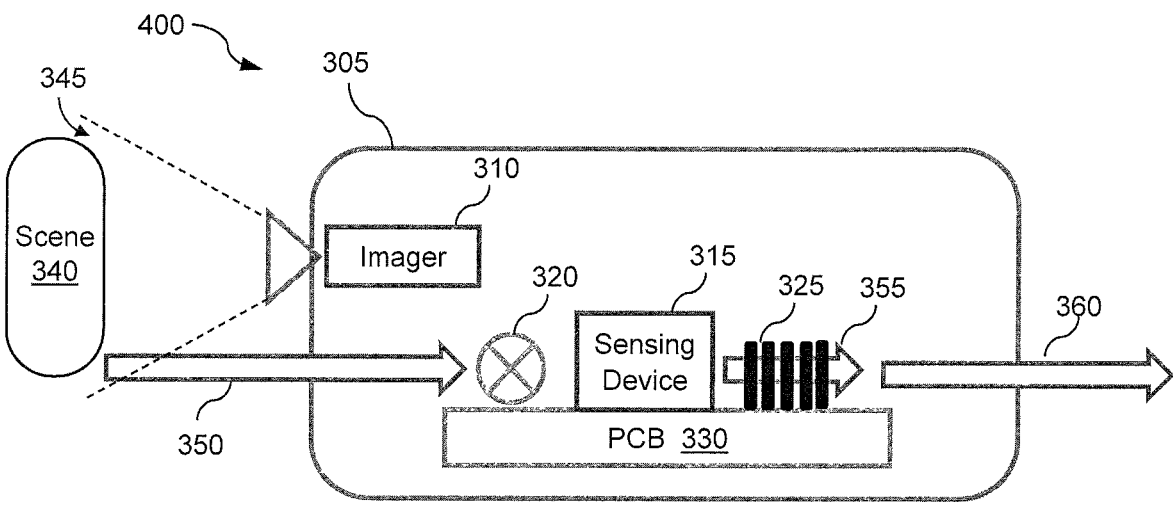
Figure 5:
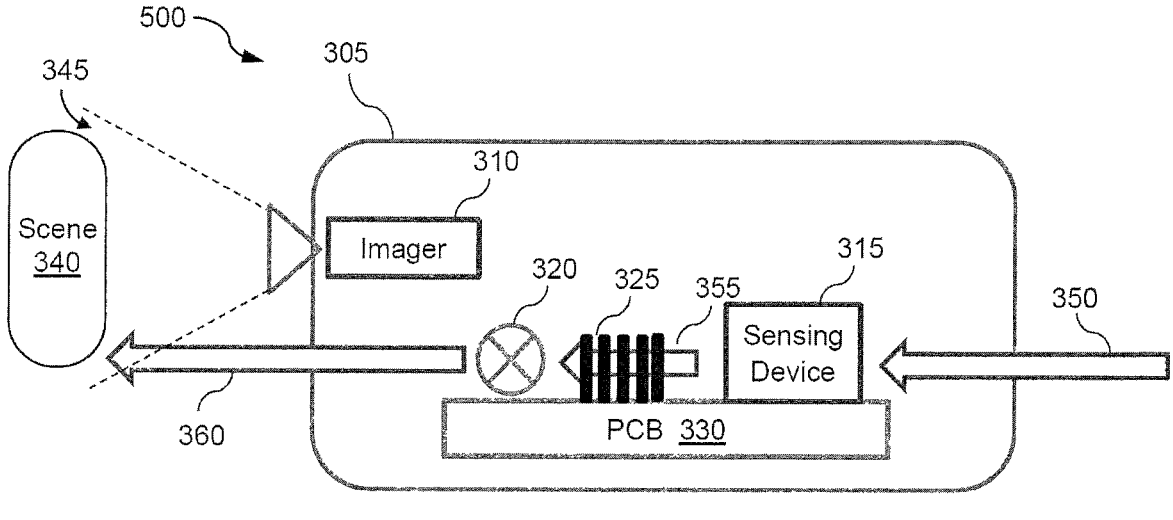

It is noted that the system 300 provides one example architecture for facilitating atmospheric absorption determination with embedded sensor data. FIGS. 4 and 5 illustrate additional example systems for facilitating atmospheric absorption determination with embedded sensor data in accordance with one or more embodiments of the present disclosure. The description of FIG. 3 generally applies to FIGS. 4 and 5, with examples of differences and other description provided herein. In FIG. 4, the sensing device 315 of a system 400 is closer to the external airflow 350 and the fan 320 compared to the sensing device 315 of the system 300. In FIG. 5, the sensing device 315 of a system 500 is closer to the external airflow 350 than the sensing device 315 of the systems 300 and 400. Positioning of the sensing device 315 and/or other components may generally be based on mechanical constraints associated with fitting all desired components within the housing 305.

In cases that the sensing device 315 is closer to the external airflow 350 (e.g., in FIG. 4) and/or away from elements (e.g., such as power dissipating electronics and/or the temperature control element 325) that adjust the temperature of the external airflow 350 (e.g., in FIG. 5), a difference between the temperature of the air within the housing 305 measured by the sensing device 315 and the temperature of the external airflow 350 may be less than that of the system 300 of FIG. 3 in which a temperature of the external airflow 350 is affected by the fan 320 as well as the temperature control element 325. Even with less compensation needed relative to the system 300 of FIG. 3, the systems 400 and 500 may apply compensation as heating of the air from electronics within the housing 305 (e.g., with or without the air going through the temperature control element 325) may noticeably affect an accuracy of atmospheric absorption determination.

Figure 6:
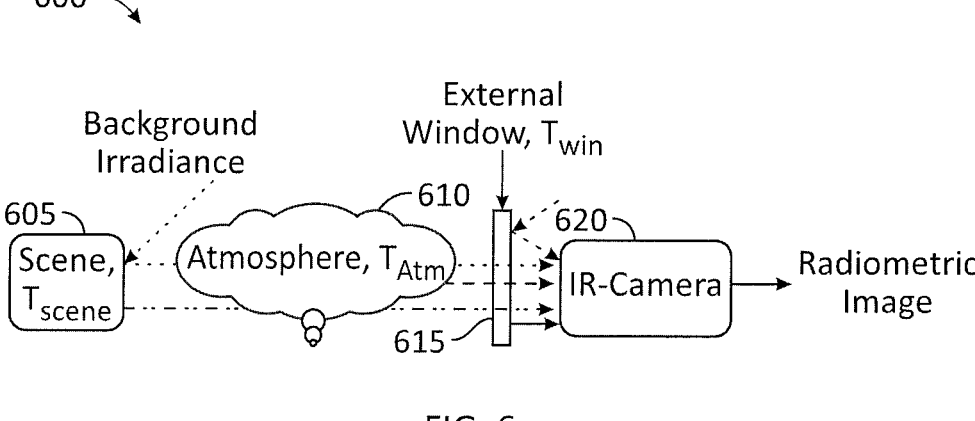
FIG. 6 illustrates an example model showing external factors related to radiation propagation from a scene to an infrared camera in accordance with one or more embodiments of the present disclosure.

FIG. 6 illustrates an example model 600 showing external factors related to radiation propagation from a scene 605 to an infrared camera 620 in accordance with one or more embodiments of the present disclosure. In an embodiment, the infrared camera 620 may be, may include, or may be a part of, the system 300, 400, or 500 that has the housing 305 and the infrared imager 310. The model 600 generates an infrared image (e.g., also referred to as a radiometric image) based on the scene 605 captured by the infrared camera 620. The model 600 factors in an atmosphere 610 and an optional window 615 between the scene 605 and the infrared camera 620. For example, the atmosphere 610 and the window 615 may be in front of an array of detectors (e.g., microbolometers) of the infrared camera 620. As such, the model 600 accounts for and/or may be adjusted to account for additional components (e.g., optical elements such as lenses and/or protective windows) provided between an imaged scene and the infrared camera 620 to account for radiometric variations attributable to such additional components.

Image data (e.g., provided in counts) may be based on an emissivity of the scene 605, a transmission coefficient of window 615, a temperature of the window 615, a temperature reflected by the window 615, an atmospheric absorption coefficient $\tau_{atm}$ of the atmosphere 610 between the scene 605 and the infrared camera 620, a temperature of the atmosphere 610, a background temperature (e.g., reflected by the scene 605), a temperature of the scene 605, and/or others. Such factors may impact radiometric accuracy and may be tracked (e.g., by the system 300, 400, or 500 and/or other system) and used as feedback for the infrared camera 620 and/or a radiometric infrared camera system that includes the infrared camera 620. In some cases, weather conditions may impact atmospheric absorption and atmospheric transmission, emissivity of objects in a scene, and/or window transmission. For example, weather conditions such as fog, rain, and humidity may result in water on the window 615 and thus affect transmission through the window 615. In some embodiments, the absorption coefficient $\tau_{atm}$ of the atmosphere 610 may be determined using embodiments herein. As one example, the atmospheric absorption coefficient of radiation of a certain waveband (e.g., long-wave IR (LWIR) radiation) captured by the infrared camera 620. The atmospheric absorption coefficient may be determined based on a moisture level in the air. The moisture level may be determined using humidity measurements and temperature measurements of air within the infrared camera 620. In some cases, the moisture level and the atmospheric absorption coefficient may be determined according to Equation (1) and (2), respectively.

FIG. 7 illustrates a flow diagram of an example process 700 for facilitating atmospheric absorption determination with embedded sensor data in accordance with one or more embodiments of the present disclosure. Although the process 700 is primarily described herein with reference to the system 300 of FIG. 3 for explanatory purposes, the process 700 can be performed in relation to the system 400, the system 500, or other system. Note that one or more operations in FIG. 7 may be combined, omitted, and/or performed in a different order as desired.

At block 705, the sensing device 315 determines a humidity value (e.g., a relative humidity value) within the housing 305. At block 710, the sensing device 315 determines a temperature value within the housing 305. In some cases, the sensing device 315 may receive air blown by the fan 320 and/or heated by the temperature control element 325 and determine the humidity value and the temperature value from the received air. At block 715, the PCB 330 (e.g., a logic device of the PCB 330) determines a moisture value based on the humidity value and the temperature value. In some cases, the moisture value may be determined according to Equation (1). The moisture value may be based on the humidity value and the temperature value compensated based on a location of the sensing device 315 within the housing 305 relative to one or more heat sources within the housing 305 (e.g., heat dissipating electronics on the PCB 330 and/or elsewhere within the housing 305, the temperature control element 325, etc.). At block 720, the PCB 330 determines an atmospheric absorption value based on the moisture value. In some cases, the atmospheric absorption value may be determined according to Equation (2). In some cases, a logic device outside the housing 305 may be used to perform block 715 and 720. For example, the logic device may receive measurements (e.g., humidity, temperature) from the sensing device 315 in near real-time or at a later time (e.g., the measurements may be stored along with corresponding timestamps for later processing by the logic device), and/or process these measurements in near real-time or at a later time.

In some embodiments, the atmospheric absorption value of an atmosphere (e.g., the atmosphere 610 of FIG. 6) may be used when determining infrared data values based on infrared radiation that traverses over the atmosphere. In this regard, the atmospheric absorption value may affect radiometric accuracy of infrared imagers (e.g., thermal imagers) when viewing objects at a distance.

FIG. 8 illustrates a flow diagram of an example process 800 for generating image data responsive to atmospheric absorption determinations in accordance with one or more embodiments of the present disclosure. Although the process 800 is primarily described herein with reference to the system 300 of FIG. 3 for explanatory purposes, the process 800 can be performed in relation to the system 400, the system 500, or other system. Note that one or more operations in FIG. 8 may be combined, omitted, and/or performed in a different order as desired.

At block 805, the infrared imager 310 (e.g., an FPA of the infrared imager 310) captures radiation (e.g., infrared radiation). The radiation may include radiation from the scene 340. At block 815, the infrared imager 310 generates infrared image data in response to the radiation. In some cases, the FPA and/or circuitry coupled to the FPA may convert the radiation into electrical signals (e.g., voltages, currents, etc.) and generate the image data based on the electrical signals. The image data may include pixel values. The pixel values may be represented in terms of digital count values generated based on the electrical signals obtained from converting the captured radiation. For example, in a case that the FPA includes or is otherwise coupled to an ADC circuit, the ADC circuit may generate digital count values based on the electrical signals. For an ADC circuit that can represent an electrical signal using 14 bits, the digital count value may range from 0 to 16,383. In some cases, the FPA may represent the image data in an image according to a palette. A given pixel of the image may have a visual representation value (e.g., a color value or a grayscale value) indicative of a temperature of the pixel. For example, a temperature associated with an object in the scene 340 may be represented in pixels of an infrared image (e.g., a thermal infrared image) formed of the image data that correspond to the object.

At block 815, the PCB 330 (e.g., a logic device of the PCB 330) processes the image data based on an atmospheric absorption value to obtain compensated image data. In some cases, the atmospheric absorption value may be determined at block 720 of FIG. 7. Adjustment of the image data based on the atmospheric absorption value allows for compensating of effects due to presence of an atmosphere (e.g., the atmosphere 610) between the infrared imager 310 and objects in the scene 340. In some cases, a logic device outside the housing 305 may be used to perform block 815. For example, the logic device may receive measurements (e.g., humidity, temperature) from the sensing device 315 and/or the image data generated at block 810 from the infrared imager 310 in near real-time or at a later time (e.g., the measurements and/or the image data may be stored along with corresponding timestamps for later processing by the logic device), and/or process these measurements and/or the image data generated in near real-time or at a later time.

Figure 9:
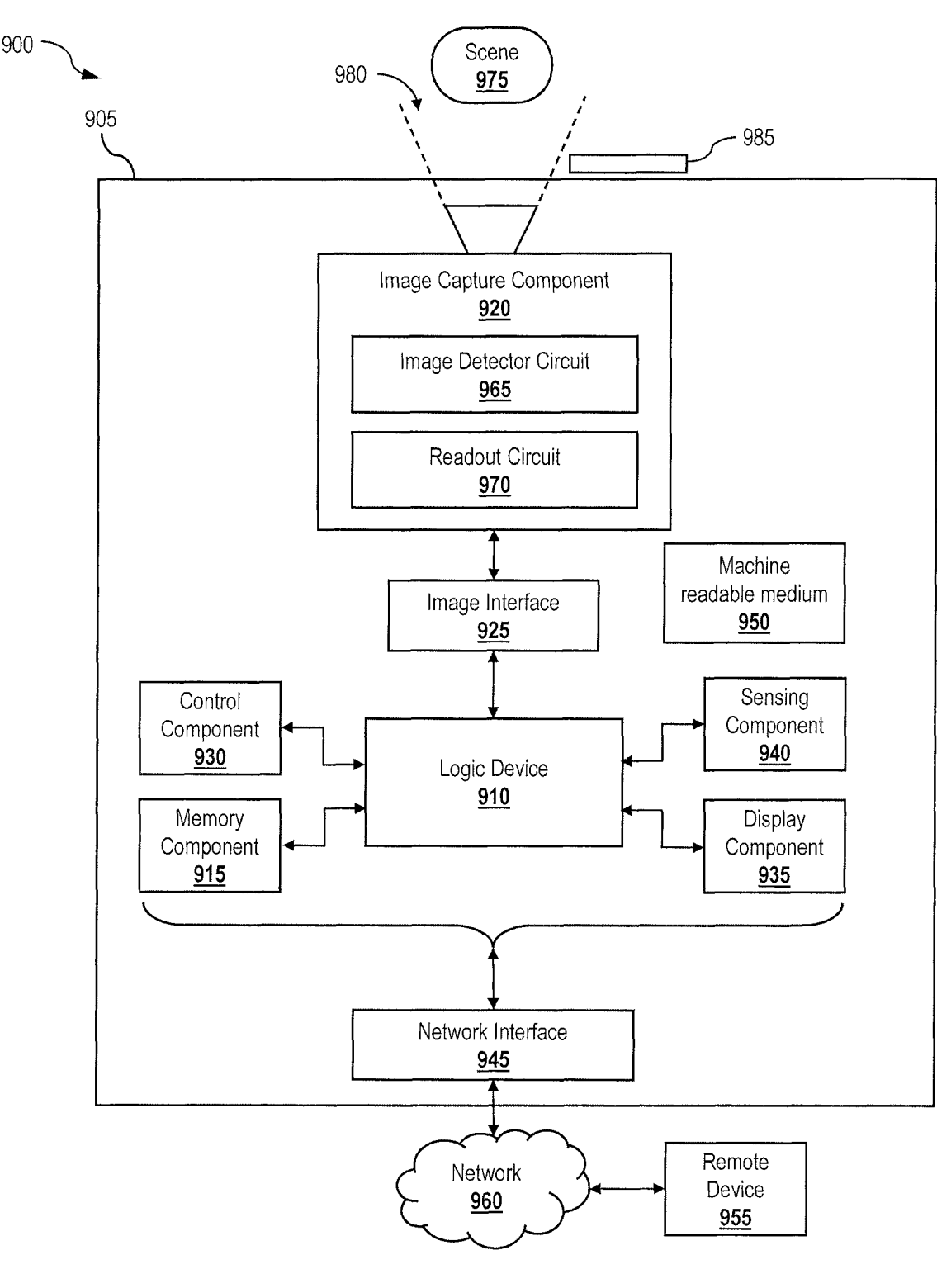
FIG. 9 illustrates a block diagram of an example imaging system in accordance with one or more embodiments of the present disclosure.

FIG. 9 illustrates a block diagram of an example imaging system 900 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 900 may be utilized for capturing and processing images in accordance with an embodiment of the disclosure. The imaging system 900 may represent any type of imaging system that detects one or more ranges (e.g., wavebands) of EM radiation and provides representative data (e.g., one or more still image frames or video image frames). The imaging system 900 may include an imaging device 905. By way of non-limiting examples, the imaging device 905 may be, may include, or may be a part of an infrared camera (e.g., a thermal camera), a visible-light camera, a tablet computer, a laptop, a personal digital assistant (PDA), a mobile device, a desktop computer, or other electronic device. The imaging device 905 may include a housing (e.g., a camera body) that at least partially encloses components of the imaging device 905, such as to facilitate compactness and protection of the imaging device 905. For example, the solid box labeled 905 in FIG. 9 may represent a housing of the imaging device 905. The housing may contain more, fewer, and/or different components of the imaging device 905 than those depicted within the solid box in FIG. 9. In an embodiment, the imaging system 900 may include a portable device. The portable device may be handheld and/or may be incorporated, for example, into a vehicle or a non-mobile installation requiring images to be stored and/or displayed. The vehicle may be a land-based vehicle (e.g., automobile, truck), a naval-based vehicle, an aerial vehicle (e.g., UAV, UAS), a space vehicle, or generally any type of vehicle that may incorporate (e.g., installed within, mounted thereon, etc.) the imaging system 900. In another example, the imaging system 900 may be coupled to various types of fixed locations (e.g., a home security mount, a campsite or outdoors mount, or other location) via one or more types of mounts.

The imaging device 905 includes, according to one implementation, a logic device 910, a memory component 915, an image capture component 920 (e.g., an imager, an image sensor device), an image interface 925, a control component 930, a display component 935, a sensing component 940, and/or a network interface 945. The logic device 910, according to various embodiments, includes one or more of a processor, a microprocessor, a central processing unit (CPU), a graphics processing unit (GPU), a single-core processor, a multi-core processor, a microcontroller, a programmable logic device (PLD) (e.g., FPGA), an ASIC, a digital signal processing (DSP) device, or other logic device, one or more memories for storing executable instructions (e.g., software, firmware, or other instructions), and/or or any other appropriate combination of processing device and/or memory to execute instructions to perform any of the various operations described herein. The logic device 910 may be configured, by hardwiring, executing software instructions, or a combination of both, to perform various operations discussed herein for embodiments of the disclosure. The logic device 910 may be configured to interface and communicate with the various other components (e.g., 915, 920, 925, 930, 935, 940, 945, etc.) of the imaging system 900 to perform such operations. For example, the logic device 910 may be configured to process captured image data received from the imaging capture component 920, store the image data in the memory component 915, and/or retrieve stored image data from the memory component 915. In one aspect, the logic device 910 may be configured to perform various system control operations (e.g., to control communications and operations of various components of the imaging system 900) and other image processing operations (e.g., video analytics, data conversion, data transformation, data compression, etc.). In some embodiments, the logic device 910 may be implemented using the PCB 330.

The memory component 915 includes, in one embodiment, one or more memory devices configured to store data and information, including infrared image data and information. The memory component 915 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the logic device 910 may be configured to execute software instructions stored in the memory component 915 so as to perform method and process steps and/or operations. The logic device 910 and/or the image interface 925 may be configured to store in the memory component 915 images or digital image data captured by the image capture component 920. In some embodiments, the memory component 915 may store various infrared images, visible-light images, combined images (e.g., infrared images blended with visible-light images), image settings, user input, sensor data, and/or other data.

In some embodiments, a separate machine-readable medium 950 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations, such as methods and operations associated with processing image data. In one aspect, the machine-readable medium 950 may be portable and/or located separate from the imaging device 905, with the stored software instructions and/or data provided to the imaging device 905 by coupling the machine-readable medium 950 to the imaging device 905 and/or by the imaging device 905 downloading (e.g., via a wired link and/or a wireless link) from the machine-readable medium 950. It should be appreciated that various modules may be integrated in software and/or hardware as part of the logic device 910, with code (e.g., software or configuration data) for the modules stored, for example, in the memory component 915.

The imaging device 905 may be a video and/or still camera to capture and process images and/or videos of a scene 975. In this regard, the image capture component 920 of the imaging device 905 may be configured to capture images (e.g., still and/or video images) of the scene 975 in a particular spectrum or modality. The image capture component 920 includes an image detector circuit 965 (e.g., a visible-light detector circuit, a thermal infrared detector circuit) and a readout circuit 970 (e.g., an ROIC). For example, the image capture component 920 may include an IR imaging sensor (e.g., IR imaging sensor array) configured to detect IR radiation in the near, middle, and/or far IR spectrum and provide IR images (e.g., IR image data or signal) representative of the IR radiation from the scene 975. For example, the image detector circuit 965 may capture (e.g., detect, sense) IR radiation with wavelengths in the range from around 700 nm to around 2 mm, or portion thereof. For example, in some aspects, the image detector circuit 965 may be sensitive to (e.g., better detect) SWIR radiation, mid-wave IR (MWIR) radiation (e.g., EM radiation with wavelength of 2 µm to 5 µm), and/or LWIR radiation (e.g., EM radiation with wavelength of 7 µm to 14 µm), or any desired IR wavelengths (e.g., generally in the 0.7 µm to 14 µm range). In other aspects, the image detector circuit 965 may capture radiation from one or more other wavebands of the EM spectrum, such as visible light, ultraviolet light, and so forth. In some embodiments, the image capture component 920 may be the infrared imager 310.

The image detector circuit 965 may capture image data (e.g., infrared image data) associated with the scene 975. To capture a detector output image, the image detector circuit 965 may detect image data of the scene 975 (e.g., in the form of EM radiation) received through an aperture 980 of the imaging device 905 and generate pixel values of the image based on the scene 975. An image may be referred to as a frame or an image frame. In some cases, the image detector circuit 965 may include an array of detectors (e.g., also referred to as an array of pixels) that can detect radiation of a certain waveband, convert the detected radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. By way of non-limiting examples, each detector may be a photodetector, such as an avalanche photodiode, an infrared photodetector, a quantum well infrared photodetector, a microbolometer, or other detector capable of converting EM radiation (e.g., of a certain wavelength) to a pixel value. The array of detectors may be arranged in rows and columns.

The detector output image may be, or may be considered, a data structure that includes pixels and is a representation of the image data associated with the scene 975, with each pixel having a pixel value that represents EM radiation emitted or reflected from a portion of the scene 975 and received by a detector that generates the pixel value. Based on context, a pixel may refer to a detector of the image detector circuit 965 that generates an associated pixel value or a pixel (e.g., pixel location, pixel coordinate) of the detector output image formed from the generated pixel values. In one example, the detector output image may be an infrared image (e.g., thermal infrared image). For a thermal infrared image (e.g., also referred to as a thermal image), each pixel value of the thermal infrared image may represent a temperature of a corresponding portion of the scene 975. In another example, the detector output image may be a visible-light image.

In an aspect, the pixel values generated by the image detector circuit 965 may be represented in terms of digital count values generated based on the electrical signals obtained from converting the detected radiation. For example, in a case that the image detector circuit 965 includes or is otherwise coupled to an ADC circuit, the ADC circuit may generate digital count values based on the electrical signals. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal. As an example, for infrared imaging, a larger amount of IR radiation being incident on and detected by the image detector circuit 965 (e.g., an IR image detector circuit) is associated with higher digital count values and higher temperatures.

The readout circuit 970 may be utilized as an interface between the image detector circuit 965 that detects the image data and the logic device 910 that processes the detected image data as read out by the readout circuit 970, with communication of data from the readout circuit 970 to the logic device 910 facilitated by the image interface 925. An image capturing frame rate may refer to the rate (e.g., detector output images per second) at which images are detected/output in a sequence by the image detector circuit 965 and provided to the logic device 910 by the readout circuit 970. The readout circuit 970 may read out the pixel values generated by the image detector circuit 965 in accordance with an integration time (e.g., also referred to as an integration period).

In various embodiments, a combination of the image detector circuit 965 and the readout circuit 970 may be, may include, or may together provide an FPA. In some aspects, the image detector circuit 965 may be a thermal image detector circuit that includes an array of microbolometers, and the combination of the image detector circuit 965 and the readout circuit 970 may be referred to as a microbolometer FPA. In some cases, the array of microbolometers may be arranged in rows and columns. The microbolometers may detect IR radiation and generate pixel values based on the detected IR radiation. For example, in some cases, the microbolometers may be thermal IR detectors that detect IR radiation in the form of heat energy and generate pixel values based on the amount of heat energy detected. The microbolometers may absorb incident IR radiation and produce a corresponding change in temperature in the microbolometers. The change in temperature is associated with a corresponding change in resistance of the microbolometers. With each microbolometer functioning as a pixel, a two-dimensional image or picture representation of the incident IR radiation can be generated by translating the changes in resistance of each microbolometer into a time-multiplexed electrical signal. The translation may be performed by the ROIC. The microbolometer FPA may include IR detecting materials such as amorphous silicon (a-Si), vanadium oxide (VO$_x$), a combination thereof, and/or other detecting material(s). In an aspect, for a microbolometer FPA, the integration time may be, or may be indicative of, a time interval during which the microbolometers are biased. In this case, a longer integration time may be associated with higher gain of the IR signal, but not more IR radiation being collected. The IR radiation may be collected in the form of heat energy by the microbolometers.

In some cases, the image capture component 920 may include one or more optical components and/or one or more filters. The optical component(s) may include one or more windows, lenses, mirrors, beamsplitters, beam couplers, and/or other components to direct and/or focus radiation to the image detector circuit 965. The optical component(s) may include components each formed of material and appropriately arranged according to desired transmission characteristics, such as desired transmission wavelengths and/or ray transfer matrix characteristics. The filter(s) may be adapted to pass radiation of some wavelengths but substantially block radiation of other wavelengths. For example, the image capture component 920 may be an IR imaging device that includes one or more filters adapted to pass IR radiation of some wavelengths while substantially blocking IR radiation of other wavelengths (e.g., MWIR filters, thermal IR filters, and narrow-band filters). In this example, such filters may be utilized to tailor the image capture component 920 for increased sensitivity to a desired band of IR wavelengths. In an aspect, an IR imaging device may be referred to as a thermal imaging device when the IR imaging device is tailored for capturing thermal IR images. Other imaging devices, including IR imaging devices tailored for capturing infrared IR images outside the thermal range, may be referred to as non-thermal imaging devices.

In one specific, not-limiting example, the image capture component 920 may include an IR imaging sensor having an FPA of detectors responsive to IR radiation including near infrared (NIR), SWIR, MWIR, LWIR, and/or very-long wave IR (VLWIR) radiation. In some other embodiments, alternatively or in addition, the image capture component 920 may include a complementary metal oxide semiconductor (CMOS) sensor or a charge-coupled device (CCD) sensor that can be found in any consumer camera (e.g., visible light camera).

In some embodiments, the imaging system 900 includes a shutter 985. The shutter 985 may be operated to selectively inserted into an optical path between the scene 975 and the image capture component 920 to expose or block the aperture 980. In some cases, the shutter 985 may be moved (e.g., slid, rotated, etc.) manually (e.g., by a user of the imaging system 900) and/or via an actuator (e.g., controllable by the logic device 910 in response to user input or autonomously, such as an autonomous decision by the logic device 910 to perform a calibration of the imaging device 905). When the shutter 985 is outside of the optical path to expose the aperture 980, the electromagnetic radiation from the scene 975 may be received by the image detector circuit 965 (e.g., via one or more optical components and/or one or more filters). As such, the image detector circuit 965 captures images of the scene 975. The shutter 985 may be referred to as being in an open position or simply as being open. When the shutter 985 is inserted into the optical path to block the aperture 980, the electromagnetic radiation from the scene 975 is blocked from the image detector circuit 965. As such, the image detector circuit 965 captures images of the shutter 985. The shutter 985 may be referred to as being in a closed position or simply as being closed. In some cases, the shutter 985 may block the aperture 980 during a calibration process, in which the shutter 985 may be used as a uniform blackbody (e.g., a substantially uniform blackbody). In some cases, the shutter 985 may be temperature controlled to provide a temperature controlled uniform black body (e.g., to present a uniform field of radiation to the image detector circuit 965). For example, in some cases, a surface of the shutter 985 imaged by the image detector circuit 965 may be implemented by a uniform blackbody coating.

Other imaging sensors that may be embodied in the image capture component 920 include a photonic mixer device (PMD) imaging sensor or other time of flight (ToF) imaging sensor, LIDAR imaging device, RADAR imaging device, millimeter imaging device, positron emission tomography (PET) scanner, single photon emission computed tomography (SPECT) scanner, ultrasonic imaging device, or other imaging devices operating in particular modalities and/or spectra. It is noted that for some of these imaging sensors that are configured to capture images in particular modalities and/or spectra (e.g., infrared spectrum, etc.), they are more prone to produce images with low frequency shading, for example, when compared with a typical CMOS-based or CCD-based imaging sensors or other imaging sensors, imaging scanners, or imaging devices of different modalities.

The images, or the digital image data corresponding to the images, provided by the image capture component 920 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images, before being applied to the images.

The image interface 925 may include, in some embodiments, appropriate input ports, connectors, switches, and/or circuitry configured to interface with external devices (e.g., a remote device 955 and/or other devices) to receive images (e.g., digital image data) generated by or otherwise stored at the external devices. In an aspect, the image interface 925 may include a serial interface and telemetry line for providing metadata associated with image data. The received images or image data may be provided to the logic device 910. In this regard, the received images or image data may be converted into signals or data suitable for processing by the logic device 910. For example, in one embodiment, the image interface 925 may be configured to receive analog video data and convert it into suitable digital data to be provided to the logic device 910.

The image interface 925 may include various standard video ports, which may be connected to a video player, a video camera, or other devices capable of generating standard video signals, and may convert the received video signals into digital video/image data suitable for processing by the logic device 910. In some embodiments, the image interface 925 may also be configured to interface with and receive images (e.g., image data) from the image capture component 920. In other embodiments, the image capture component 920 may interface directly with the logic device 910.

The control component 930 includes, in one embodiment, a user input and/or an interface device, such as a rotatable knob (e.g., potentiometer), push buttons, slide bar, keyboard, and/or other devices, that is adapted to generate a user input control signal. The logic device 910 may be configured to sense control input signals from a user via the control component 930 and respond to any sensed control input signals received therefrom. The logic device 910 may be configured to interpret such a control input signal as a value, as generally understood by one skilled in the art. In one embodiment, the control component 930 may include a control unit (e.g., a wired or wireless handheld control unit) having push buttons adapted to interface with a user and receive user input control values. In one implementation, the push buttons and/or other input mechanisms of the control unit may be used to control various functions of the imaging device 905, such as calibration initiation and/or related control, shutter control, autofocus, menu enable and selection, field of view, brightness, contrast, noise filtering, image enhancement, and/or various other features. In some cases, the control component 930 may be used to provide user input (e.g., for adjusting image settings).

The display component 935 includes, in one embodiment, an image display device (e.g., a liquid crystal display (LCD)) or various other types of generally known video displays or monitors. The logic device 910 may be configured to display image data and information on the display component 935. The logic device 910 may be configured to retrieve image data and information from the memory component 915 and display any retrieved image data and information on the display component 935. The display component 935 may include display circuitry, which may be utilized by the logic device 910 to display image data and information. The display component 935 may be adapted to receive image data and information directly from the image capture component 920, logic device 910, and/or image interface 925, or the image data and information may be transferred from the memory component 915 via the logic device 910. In some aspects, the control component 930 may be implemented as part of the display component 935. For example, a touchscreen of the imaging device 905 may provide both the control component 930 (e.g., for receiving user input via taps and/or other gestures) and the display component 935 of the imaging device 905.

The sensing component 940 includes, in one embodiment, one or more sensors of various types, depending on the application or implementation requirements, as would be understood by one skilled in the art. Sensors of the sensing component 940 provide data and/or information to at least the logic device 910. In one aspect, the logic device 910 may be configured to communicate with the sensing component 940. In various implementations, the sensing component 940 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 940 may represent conventional sensors as generally known by one skilled in the art for monitoring various conditions (e.g., environmental conditions) that may have an effect (e.g., on the image appearance) on the image data provided by the image capture component 920. In some embodiments, the sensing component 940 may be the sensing device 315 for measuring humidity and temperature.

In some implementations, the sensing component 940 (e.g., one or more sensors) may include devices that relay information to the logic device 910 via wired and/or wireless communication. For example, the sensing component 940 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the logic device 910 can use the information (e.g., sensing data) retrieved from the sensing component 940 to modify a configuration of the image capture component 920 (e.g., adjusting a light sensitivity level, adjusting a direction or angle of the image capture component 920, adjusting an aperture, etc.). The sensing component 940 may include a temperature sensing component to provide temperature data (e.g., one or more measured temperature values) various components of the imaging device 905, such as the image detection circuit 965 and/or the shutter 985. By way of non-limiting examples, a temperature sensor may include a thermistor, thermocouple, thermopile, pyrometer, and/or other appropriate sensor for providing temperature data.

In some embodiments, various components of the imaging system 900 may be distributed and in communication with one another over a network 960. In this regard, the imaging device 905 may include a network interface 945 configured to facilitate wired and/or wireless communication among various components of the imaging system 900 over the network 960. In such embodiments, components may also be replicated if desired for particular applications of the imaging system 900. That is, components configured for same or similar operations may be distributed over a network. Further, all or part of any one of the various components may be implemented using appropriate components of the remote device 955 (e.g., a conventional digital video recorder (DVR), a computer configured for image processing, and/or other device) in communication with various components of the imaging system 900 via the network interface 945 over the network 960, if desired. Thus, for example, all or part of the logic device 910, all or part of the memory component 915, and/or all of part of the display component 935 may be implemented or replicated at the remote device 955. In some embodiments, the logic device 910 and/or a logic device of the remote device 955 may be used to determine moisture levels (e.g., based on humidity and temperature measurements) and/or atmospheric absorption values. In some embodiments, the imaging system 900 may not include imaging sensors (e.g., image capture component 920), but instead receive images or image data from imaging sensors located separately and remotely from the logic device 910 and/or other components of the imaging system 900. It will be appreciated that many other combinations of distributed implementations of the imaging system 900 are possible, without departing from the scope and spirit of the disclosure.

Furthermore, in various embodiments, various components of the imaging system 900 may be combined and/or implemented or not, as desired or depending on the application or requirements. In one example, the logic device 910 may be combined with the memory component 915, image capture component 920, image interface 925, display component 935, sensing component 940, and/or network interface 945. In another example, the logic device 910 may be combined with the image capture component 920, such that certain functions of the logic device 910 are performed by circuitry (e.g., a processor, a microprocessor, a logic device, a microcontroller, etc.) within the image capture component 920.

In an embodiment, the remote device 955 may be referred to as a host device or a base station device. The host device may communicate with the image device 905 via the network interface 945 and the network 960. For example, the imaging device 905 may be a camera that can communicate with the remote device 955. The network interface 945 and the network 960 may collectively provide appropriate interfaces, ports, connectors, switches, antennas, circuitry, and/or generally any other components of the imaging device 905 and the remote device 955 to facilitate communication between the imaging device 905 and the remote device 955. Communication interfaces may include an Ethernet interface (e.g., Ethernet GigE interface, Ethernet GigE Vision interface), a universal serial bus (USB) interface, other wired interface, a cellular interface, a Wi-Fi interface, other wireless interface, or generally any interface to allow communication of data between the imaging device 905 and the remote device 955.

Figure 10:
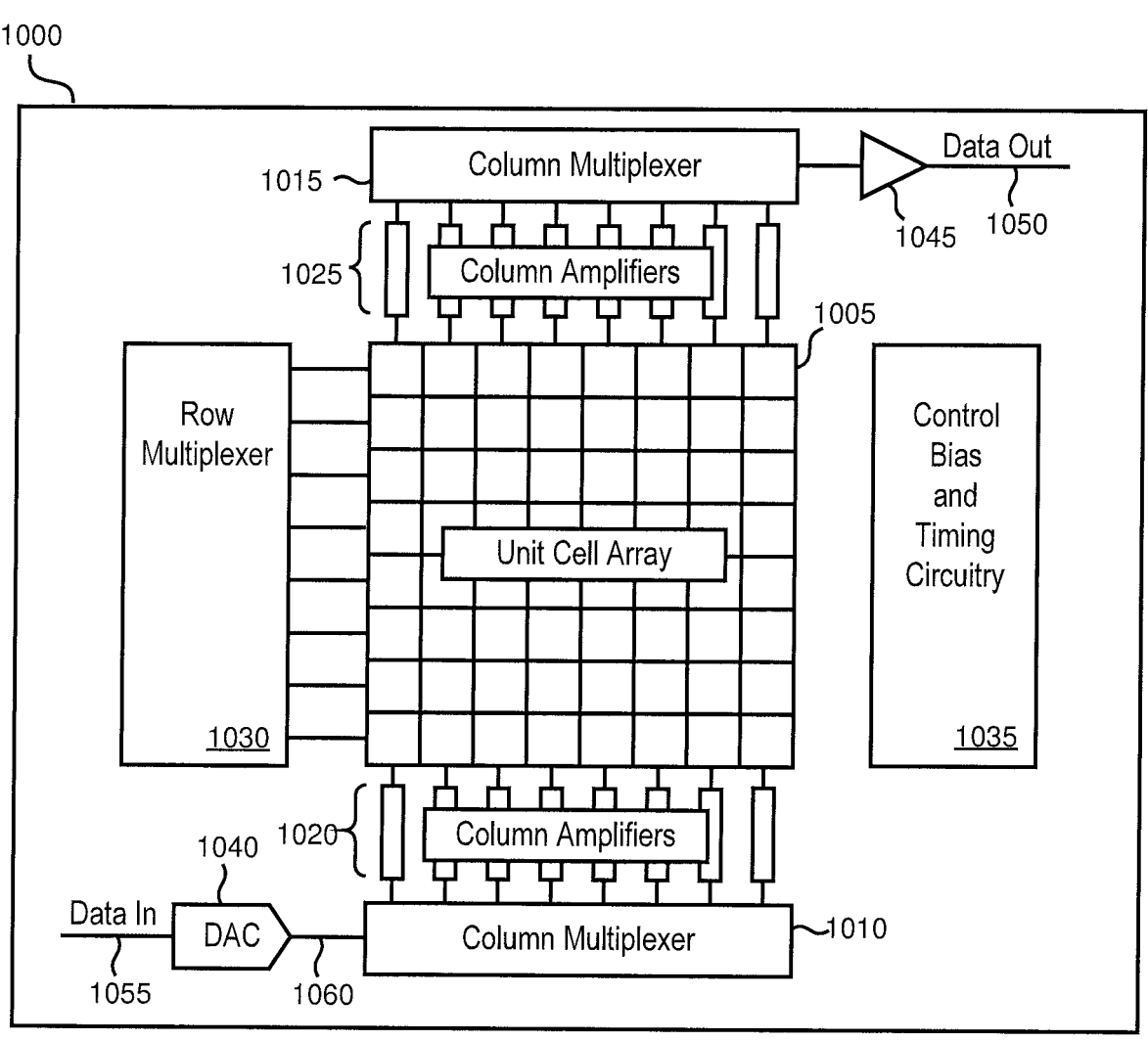
FIG. 10 illustrates a block diagram of an example image sensor assembly in accordance with one or more embodiments of the present disclosure.

FIG. 10 illustrates a block diagram of an example image sensor assembly 1000 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image sensor assembly 1000 may be an FPA, for example, implemented as the image capture component 920 of FIG. 9.

The image sensor assembly 1000 includes a unit cell array 1005, column multiplexers 1010 and 1015, column amplifiers 1020 and 1025, a row multiplexer 1030, control bias and timing circuitry 1035, a digital-to-analog converter (DAC) 1040, and a data output buffer 1045. In some aspects, operations of and/or pertaining to the unit cell array 1005 and other components may be performed according to a system clock and/or synchronization signals (e.g., line synchronization (LSYNC) signals). The unit cell array 1005 includes an array of unit cells. In an aspect, each unit cell may include a detector (e.g., a pixel) and interface circuitry. The interface circuitry of each unit cell may provide an output signal, such as an output voltage or an output current, in response to a detection signal (e.g., detection current, detection voltage) provided by the detector of the unit cell. The output signal may be indicative of the magnitude of EM radiation received by the detector and may be referred to as image pixel data or simply image data. The column multiplexer 1015, column amplifiers 1020, row multiplexer 1030, and data output buffer 1045 may be used to provide the output signals from the unit cell array 1005 as a data output signal on a data output line 1050. The output signals on the data output line 1050 may be provided to components downstream of the image sensor assembly 1000, such as processing circuitry (e.g., the logic device 910 of FIG. 9), memory (e.g., the memory component 915 of FIG. 9), display device (e.g., the display component 935 of FIG. 9), and/or other component to facilitate processing, storage, and/or display of the output signals. The data output signal may be an image formed of the pixel values for the image sensor assembly 1000. In this regard, the column multiplexer 1015, the column amplifiers 1020, the row multiplexer 1030, and the data output buffer 1045 may collectively provide an ROIC (or portion thereof) of the image sensor assembly 1000. In an aspect, the interface circuitry may be considered part of the ROIC, or may be considered an interface between the detectors and the ROIC. In some embodiments, components of the image sensor assembly 1000 may be implemented such that the unit cell array 1005 and the ROIC may be part of a single die.

The column amplifiers 1025 may generally represent any column processing circuitry as appropriate for a given application (analog and/or digital), and is not limited to amplifier circuitry for analog signals. In this regard, the column amplifiers 1025 may more generally be referred to as column processors in such an aspect. Signals received by the column amplifiers 1025, such as analog signals on an analog bus and/or digital signals on a digital bus, may be processed according to the analog or digital nature of the signal. As an example, the column amplifiers 1025 may include circuitry for processing digital signals. As another example, the column amplifiers 1025 may be a path (e.g., no processing) through which digital signals from the unit cell array 1005 traverses to get to the column multiplexer 1015. As another example, the column amplifiers 1025 may include an ADC for converting analog signals to digital signals (e.g., to obtain digital count values). These digital signals may be provided to the column multiplexer 1015.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 1035 may generate the bias signals and provide them to the unit cells. By providing appropriate bias signals to each unit cell, the unit cell array 1005 may be effectively calibrated to provide accurate image data in response to light (e.g., visible-light, IR light) incident on the detectors of the unit cells. In an aspect, the control bias and timing circuitry 1035 may be, may include, or may be a part of, a logic circuit.

The control bias and timing circuitry 1035 may generate control signals for addressing the unit cell array 1005 to allow access to and readout of image data from an addressed portion of the unit cell array 1005. The unit cell array 1005 may be addressed to access and readout image data from the unit cell array 1005 row by row, although in other implementations the unit cell array 1005 may be addressed column by column or via other manners.

The control bias and timing circuitry 1035 may generate bias values and timing control voltages. In some cases, the DAC 1040 may convert the bias values received as, or as part of, data input signal on a data input signal line 1055 into bias signals (e.g., analog signals on analog signal line(s) 1060) that may be provided to individual unit cells through the operation of the column multiplexer 1010, column amplifiers 1020, and row multiplexer 1030. For example, the DAC 1040 may drive digital control signals (e.g., provided as bits) to appropriate analog signal levels for the unit cells. In some technologies, a digital control signal of 0 or 1 may be driven to an appropriate logic low voltage level or an appropriate logic high voltage level, respectively. In another aspect, the control bias and timing circuitry 1035 may generate the bias signals (e.g., analog signals) and provide the bias signals to the unit cells without utilizing the DAC 1040. In this regard, some implementations do not include the DAC 1040, data input signal line 1055, and/or analog signal line(s) 1060. In an embodiment, the control bias and timing circuitry 1035 may be, may include, may be a part of, or may otherwise be coupled to the logic device 110 and/or image capture component 920 of FIG. 9.

In an embodiment, the image sensor assembly 1000 may be implemented as part of an imaging device (e.g., the imaging device 905). In addition to the various components of the image sensor assembly 1000, the imaging device may also include one or more processors, memories, logic, displays, interfaces, optics (e.g., lenses, mirrors, beamsplitters), and/or other components as may be appropriate in various implementations. In an aspect, the data output signal on the data output line 1050 may be provided to the processors (not shown) for further processing. For example, the data output signal may be an image formed of the pixel values from the unit cells of the image sensor assembly 1000. The processors may perform operations such as non-uniformity correction (e.g., flat-field correction or other calibration technique), spatial and/or temporal filtering, and/or other operations.

The images (e.g., processed images) may be stored in memory (e.g., external to or local to the imaging system) and/or displayed on a display device (e.g., external to and/or integrated with the imaging system). The various components of FIG. 10 may be implemented on a single chip or multiple chips. Furthermore, while the various components are illustrated as a set of individual blocks, various of the blocks may be merged together or various blocks shown in FIG. 10 may be separated into separate blocks.

It is noted that in FIG. 10 the unit cell array 1005 is depicted as an 8×8 (e.g., 8 rows and 8 columns of unit cells. However, the unit cell array 1005 may be of other array sizes. By way of non-limiting examples, the unit cell array 1005 may include 512×512 (e.g., 512 rows and 512 columns of unit cells), 1024×1024, 2048×2048, 4096×4096, 8192×8192, and/or other array sizes. In some cases, the array size may have a row size (e.g., number of detectors in a row) different from a column size (e.g., number of detectors in a column). Examples of frame rates may include 30 Hz, 60 Hz, and 120 Hz. In an aspect, each unit cell of the unit cell array 1005 may represent a pixel.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system comprising:
a housing;
a sensing device within the housing, wherein the sensing device is configured to determine a humidity within the housing and a temperature within the housing; and
a logic device configured to:
compensate the humidity and the temperature for heat within the housing from heat sources within the housing based on a location of the sensing device within the housing relative to the heat sources within the housing;
determine a moisture value based on compensation of the humidity and the temperature for the heat within the housing from the heat sources; and determine an atmospheric absorption value based on the moisture value.

2. The system of claim 1, wherein the logic device is configured to compensate the humidity and the temperature to obtain a compensated humidity value and a compensated temperature value, and wherein the moisture value is based on the compensated humidity value and the compensated temperature value.

3. The system of claim 2, further comprising a printed circuit board within the housing comprising heat dissipating electronics, wherein the heat sources comprise the heat dissipating electronics.

4. The system of claim 3, wherein the logic device is implemented by the printed circuit board.

5. The system of claim 1, further comprising a fan within the housing and electronics within the housing, wherein the heat sources comprise the electronics, wherein the fan is configured to generate a continuous airflow that is heated by the heat sources, and wherein the sensing device is configured to determine the humidity within the housing and the temperature within the housing based on the continuous airflow heated by the heat sources.

6. The system of claim 1, further comprising a focal plane array (FPA) configured to capture radiation from a scene and generate infrared image data associated with the scene based on the radiation,
wherein the logic device is further configured to:
receive the infrared image data associated with the scene and process the infrared image data based on the atmospheric absorption value to obtain compensated infrared image data; and
determine a temperature associated with an object in the scene based on the compensated infrared image data, wherein the atmospheric absorption value is associated with an atmosphere between the FPA and the object in the scene.

7. The system of claim 1, further comprising a fan within the housing, wherein the fan is configured to receive an external airflow and circulate the external airflow within the housing to provide an internal airflow within the housing, wherein the sensing device is further configured to receive a portion of the internal airflow, and wherein the humidity is based on the portion of the internal airflow.

8. The system of claim 7, further comprising a temperature control element positioned between the fan and the sensing device and having a temperature, wherein a temperature of the portion of the internal airflow is based in part on the temperature of the temperature control element.

9. The system of claim 1, wherein the sensing device is configured to directly receive an external airflow and configured to determine the humidity based on the external airflow.

10. The system of claim 9, further comprising a fan and a temperature control element having a temperature, wherein the fan and the temperature control element are downstream of the sensing device relative to the external airflow, wherein the temperature within the housing is based in part on the temperature of the temperature control element, and wherein the moisture value is an absolute moisture value.

11. The system of claim 1, wherein the system is an unmanned aerial system, and wherein the unmanned aerial system comprises a payload including the housing and the sensing device.

12. A method comprising:
determining, by a sensing device within a housing, a humidity within the housing;

determining, by the sensing device, a temperature within the housing;

compensating the humidity and the temperature for heat within the housing from heat sources within the housing based on a location of the sensing device within the housing relative to the heat sources within the housing;

determining a moisture value based on the compensating; and determining an atmospheric absorption value based on the moisture value.

13. The method of claim 12, wherein the humidity is compensated to obtain a compensated humidity value, wherein the temperature is compensated to obtain a compensated temperature value, and wherein the moisture value is based on the compensated humidity value and the compensated temperature value.

14. The method of claim 13, further comprising generating, by a fan, a continuous airflow, wherein the continuous airflow is heated by the heat sources, and wherein the humidity within the housing and the temperature within the housing are based on the heated continuous airflow.

15. The method of claim 12, further comprising:

capturing, by a focal plane array (FPA), radiation from a scene;

generating, by the FPA, infrared image data based on the radiation; and processing the infrared image data based on the atmospheric absorption value to obtain compensated infrared image data.

16. The method of claim 15, further comprising determining a temperature associated with an object in the scene based on the compensated infrared image data, wherein the atmospheric absorption value is associated with an atmosphere between the FPA and the object in the scene.

17. The method of claim 15, wherein the FPA is mounted as a payload of an aerial vehicle, and wherein the radiation from the scene is captured during a flight of the aerial vehicle.

18. The method of claim 12, further comprising:

receiving, by a fan within the housing, an external airflow; and circulating, by the fan, the external airflow within the housing to provide an internal airflow within the housing, wherein the humidity is based on a portion of the internal airflow, wherein the temperature within the housing is based on a temperature of electronics within the housing and/or a temperature of cooling flanges within the housing.

19. The method of claim 12, further comprising receiving, by the sensing device, an external airflow, wherein the humidity is based on the external airflow.

20. The system of claim 5, wherein the fan is configured to generate the continuous airflow that is directed to the sensing device and heated by the heat sources.

* * * * *